United States Patent

Borkenhagen et al.

[11] Patent Number: 6,151,664
[45] Date of Patent: Nov. 21, 2000

[54] PROGRAMMABLE SRAM AND DRAM CACHE INTERFACE WITH PRESET ACCESS PRIORITIES

[75] Inventors: John Michael Borkenhagen, Rochester; Gerald Gregory Fagerness, Mazeppa; John David Irish, Rochester; David John Krolak, Dodge Center, all of Minn.

[73] Assignee: International Business Machines Corporation, Armonk, N.Y.

[21] Appl. No.: 09/329,134

[22] Filed: Jun. 9, 1999

[51] Int. Cl.[7] ..................................................... G06F 13/18
[52] U.S. Cl. ........................... 711/150; 711/151; 711/121; 710/113; 710/241; 710/244; 710/260; 710/265
[58] Field of Search ....................... 711/150, 151, 711/152, 3, 104, 121; 710/113, 112, 107, 241, 243, 244, 260, 265; 712/244

[56] References Cited

U.S. PATENT DOCUMENTS

| | | |
|---|---|---|
| 5,293,496 | 3/1994 | White et al. ............................ 710/108 |
| 5,307,477 | 4/1994 | Taylor et al. ............................... 711/3 |
| 5,511,224 | 4/1996 | Tran et al. ............................... 710/128 |
| 5,542,062 | 7/1996 | Taylor et al. ............................... 711/3 |
| 5,689,728 | 11/1997 | Sugimoto et al. ........................ 710/38 |
| 5,790,838 | 8/1998 | Irish et al. . |
| 5,802,002 | 9/1998 | Ienaga . |
| 5,829,026 | 10/1998 | Leung et al. . |
| 5,895,487 | 4/1999 | Boyd et al. . |
| 5,943,681 | 8/1999 | Ooishi ..................................... 711/105 |

*Primary Examiner*—B. James Peikari
*Attorney, Agent, or Firm*—Robert J. Mauri; Schmeiser, Olsen & Watts

[57] ABSTRACT

A cache interface that supports both Static Random Access Memory (SRAM) and Dynamic Random Access Memory (DRAM) is disclosed. The cache interface preferably comprises two portions, one portion on the processor and one portion on the cache. A designer can simply select which RAM he or she wishes to use for a cache, and the cache controller interface portion on the processor configures the processor to use this type of RAM. The cache interface portion on the cache is simple when being used with DRAM in that a busy indication is asserted so that the processor knows when an access collision occurs between an access generated by the processor and the DRAM cache. An access collision occurs when the DRAM cache is unable to read or write data due to a precharge, initialization, refresh, or standby state. When the cache interface is used with an SRAM cache, the busy indication is preferably ignored by a processor and the processor's cache interface portion. Additionally, the disclosed cache interface allows speed and size requirements for the cache to be programmed into the interface. In this manner, the interface does not have to be redesigned for use with different sizes or speeds of caches.

26 Claims, 6 Drawing Sheets

PROGRAMMABLE SRAM AND DRAM CACHE INTERFACE WITH PRESET ACCESS PRIORITIES

RELATED APPLICATION

This application is related to a copending patent application by Krolak et at., entitled "Data Processing System and Multi-Way Set Associative Cache Utilizing Class Predict Data Structure and Method Thereof", Ser. No. 08/924,272, filed Sep. 5, 1997, and is incorporated herein by reference.

BACKGROUND OF THE INVENTION

1. Technical Field

This invention generally relates to computer system cache memory and more specifically relates to interfaces for random access cache memories.

2. Background Art

Today, our society is heavily depenent upon computers for everyday activity. Computers are found in homes, in business offices, and in most production and manufacturing environments. Most computer systems are controlled by a central processing unit (CPU) and have various levels of memory which can be used by the CPU to perform the various functions for which it has been programmed. Typically, computer programs are loaded into the computer system's memory storage areas and executed by the CPU. The programs and data are stored in different areas of the computer system's memory depending on what type of function the CPU is performing. Traditionally, the computer system's memory has been classified as either main memory (primary or main storage) or secondary memory (secondary storage). Programs and data need to be in main memory in order to be executed or referenced by a running program, while programs or data not needed immediately may be kept in secondary memory until needed and then brought into main storage for execution or reference.

In the 1960's, it became clear that the traditional memory storage hierarchy could be extended by one more level with dramatic improvements in performance and utilization. This additional level, the "cache," is a high-speed memory that is much faster than the main memory. Cache storage is relatively expensive when compared with main memory and therefore, in a typical computer system, only relatively small amounts cache memory are used. In addition, limiting the size of cache storage enhances the speed of the cache.

Cache memory generally operates faster than main memory, typically by a factor of five to ten times and may, under certain circumstances, approach the operational speed of the CPU itself. By keeping the most frequently accessed instructions and/or data in high speed cache memory, average overall memory access time for the system will approach the access time of the cache. There is a certain amount of overhead involved in shuttling information between various memory locations. This overhead is kept as small as possible so that it does not cancel out the performance increase achieved by utilizing cache storage. In addition, if the specific program instruction to be executed has been pre-loaded into the cache, the CPU may execute the program instruction without returning to either main memory or secondary memory, thereby significantly increasing the operational speed of the system. Whenever the CPU requests a specific instruction or item of data, the CPU generates a request which includes a tag as part of the address or location in memory where the instruction or data may be found. If the tag for the information requested by the CPU matches a tag for a line of memory currently residing in the cache, then the CPU can access the data or instruction from the cache. If the tag doesn't match any of the tags for the lines of memory in the cache, then the information must be fetched and loaded into the cache.

Cache memory may be subdivided into different categories based on what part of the computer system it is located on or associated with. Level 1 cache memory is generally located in the same semiconductor die area that the processor is located. Previously, additional cache memory that is not located on the same chip with the microprocessor is usually referred to as Level 2 cache memory. Currently, more processor designers are locating Level 2 caches on the same semiconductor chip as the processor. Level 3 memory is usually called "main memory," but some computers have Level 3 memory that is cache memory and a Level 4 memory that is main memory.

In the past, caches have been almost exclusively been made of Random Access Memory (RAM) that is static. This Static RAM (SRAM) is made so that the individual cells that contain the bits of data do not have to be refreshed. SRAM, because of the design criteria of maintaining individual cell's datum, takes a large amount of semiconductor area and is relatively expensive, but has high speed. Another competing RAM is Dynamic RAM (DRAM). DRAM is any RAM wherein the cells of data have to be refreshed. Each cell, if not refreshed, will slowly lose its information. The design of DRAM allows it to cover much less area for the same number of bits as SRAM. Additionally, for the same area, DRAM holds many more bits of information than does SRAM. Unfortunately, because each cell in a DRAM array needs to be refreshed periodically, there are times when a particular cell or group of cells cannot be written or read because refresh is occurring.

Recently, because of the high number of data bits that are able to be placed in a small area for DRAM, some designers have used DRAM in L2 caches. For instance, in U.S. Pat. No. 5,829,026, "Method and Structure for Implementing a Cache Memory Using a DRAM Array," by Leung, et al., a DRAM cache that can be on or off the same chip as that holding the processor is disclosed. Also, in U.S. Pat. No. 5,895,487, entitled "Integrated Processing and L2 DRAM cache," by Boyd, et al., an L2 DRAM cache is disclosed that is located on the same semiconductor chip as the processor. Embedded DRAM (EDRAM) is DRAM that is created from logic technology that has less density than normal drams but has access times that are approaching SRAM access times.

When designing a semiconductor chip having a processor and an off- or on-chip L2 cache, it would beneficial to have an option as to whether the L2 cache is SRAM or DRAM. Unfortunately, the previously discussed patents only provide a cache interface that interfaces with DRAM (or DRAM). Similarly, cache interfaces for SRAM only interface with SRAM.

Additionally, current cache interfaces do not provide any programmability. For systems having SRAM caches, in particular, a designer who wishes to add an SRAM cache that is a certain size and speed must create an interface for this particular size and speed of SRAM cache. If the size or speed of the SRAM cache is changed during the next version of the processor, the interface must be redesigned. Likewise, if the designer wishes to en large a DRAM cache, he or she must redesign the cache interface.

These problems are particularly egregious in today's processor marketing environment, where processor manufacturers like to sell multiple versions of the same processor, each version having a different amount and/or speed of cache.

Although there are SRAM and DRAM cache interfaces, there exists a need to provide a programmable cache interface that supports both SRAM and DRAM caches. Additionally, designers are currently burdened with creating new cache interfaces whenever the size or speed of the cache changes; consequently, a programmable cache interface that allows the size and speed of the cache to be easily changed is needed.

BRIEF SUMMARY OF INVENTION

According to the present invention, a cache interface that supports both Static Random Access Memory (SRAM) and Dynamic Random Access Memory (DRAM) is disclosed. The cache interface preferably comprises two portions, one portion on the processor and one portion on the cache. A designer can simply select which RAM he or she wishes to use for a cache, and the cache interface portion on the processor RAM configures the processor to use this type of RAM. The cache interface portion on the cache is simple when being used with DRAM in that a busy indication is asserted so that the processor knows when an access collision occurs between an access generated by the processor and the DRAM cache. An access collision occurs when the DRAM cache is unable to read or write data due to a precharge, initialization, refresh, or standby state. If the busy indication is used with an L2 cache controller that already has class miss logic, the busy indication preferably is routed to the class miss logic, as the busy indication should cause to processor to act (logically) as if the processor had a class miss. The benefit of this configuration is that the class miss structure already exists and only minor modifications to the structure need be made to enable the L2 cache controller to use the current invention. If the L2 controller does not have class miss logic, the L2 cache controller will have to have some modifications to support the busy indication as it is disclosed herein. When the cache interface is used with an SRAM cache, the busy indication is preferably ignored by a processor and the processor's cache interface portion.

Additionally, the disclosed cache interface allows speed and size requirements for the cache to be programmed into the interface. In this manner, the interface does not have to be redesigned for use with different sizes or speeds of caches.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

DETAILED DESCRIPTION OF INVENTION

Figure 1:
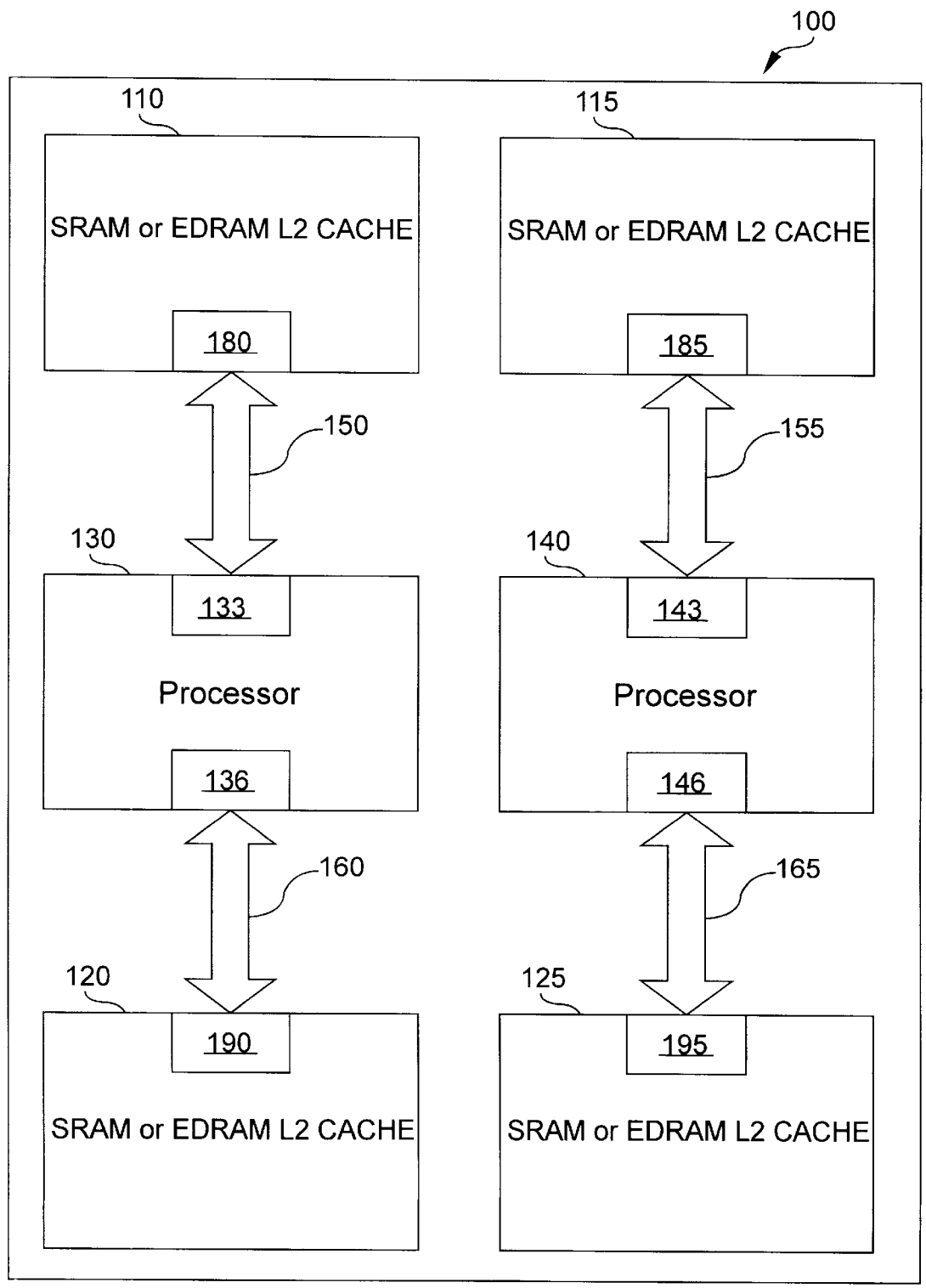
FIG. 1 is a block diagram of a semiconductor package having a preferred embodiment of the present invention.

A cache interface that supports both Static Random Access Memory (SRAM) and Dynamic Random Access Memory (DRAM) is disclosed. The cache interface preferably comprises two portions, one portion on the processor (preferably as part of the L2 cache controller) and one portion on the cache. The processor portion of the cache interface is programmable to support a DRAM or an SRAM L2 (or higher) cache, multiple different cache speeds, and different cache sizes. Thus, the processor portion of the cache interface should not need to change for the processor to access a wide variety of different size, speed, and types of caches. The cache portion of the cache interface is, however, preferably allowed to change to best support different cache RAM (DRAM or SRAM).

It is important to note that the current invention works with caches and cache arrays that are comprised of RAM that does have to be refreshed (DRAM) and RAM that does not have to be refreshed (SRAM). While only DRAM will be discussed, the current invention is applicable to any types of DRAM, including and particularly Embedded DRAM (DRAM). EDRAM is currently is the only DRAM that is fast enough to support Single Data Rate (SDR) and Double Data Rate (DDR) interfaces. However, because EDRAM must be refreshed, it is still DRAM and will be lumped into the DRAM category. Furthermore, the current invention works with any type of memory that has functionality equivalent to the busy indication.

The DRAM cache interface is simple in that a busy indication is asserted so that the processor knows when an access collision occurs between an access generated by the processor and the DRAM cache. An access collision occurs when the DRAM cache is unable to read or write data due to a precharge, initialization, refresh, or standby state. While the busy indication means that there will be a certain number of accesses by a processor that are rejected (are "busied"), this amount of rejections should be small, on the order of two percent. By providing a busy indication, there is less of need for deep input/output buffers, First-In, First Out buffers (FIFOs), or complex clocking schemes. Providing buffers will, however, provide additional improvement in the form of less access collisions. As a consequence of this, preferably read and write buffers that are wider than the "external" cache bus (the bus between the cache and the processor) are provided to further lessen the numbers of access collisions.

Furthermore, the most preferred embodiment of the present invention uses the class scheme disclosed in copending patent application by Krolak et al. (hereinafter, "Krolak"), entitled "Data Processing System and Multi-Way Set Associative Cache Utilizing Class Predict Data Structure and Method Thereof", Ser. No. 08/924,272, filed Sep. 5, 1997. A cache controller using the invention disclosed in the Krolak application would already have cache miss logic, and the busy indication would be routed to and act as a logical extension of the class miss logic. Additionally, the most preferred embodiment of the present invention comprises a pipelined memory interface, such as that described in U.S. Pat. No. 5,790,838, by Irish et al. (hereinafter, "Irish"), entitled "Pipelined Memory Interface and Method for Using the Same," which is incorporated by reference. These concepts are discussed in more detail below.

When SRAM is used in the cache array, it is preferred that the cache portion of the cache interface be changed to remove performance enhancements related to DRAM caches, as these enhancements are generally not necessary for SRAM. These DRAM performance enhancements include read buffers, the read buffer address register, and the busy indication. Even though the cache portion of the cache interface preferably changes when SRAM or DRAM is used as the cache, the processor portion of the cache interface should not change.

A designer can choose which type of cache (SRAM or DRAM) the interface works with by adjusting a type of RAM indicator on the processor cache interface portion. If the type of RAM indicator is adjusted to indicate SRAM, then the processor knows that the busy indication is ignored. Conversely, if the type of RAM indicator is adjusted to indicate DRAM, the processor knows that the busy indication is important.

Additionally, the disclosed cache interface allows speed and size requirements for the cache to be programmed into the cache portion of the cache interface. A designer can change the speed of the interface or the size of the RAM by adjusting indicators for these features. In this manner, the interface does not have to be redesigned for use with different sizes or speeds of caches.

As stated previously, it is preferred that the cache interface of the current invention have two portions, one of which is in or near the same area of semiconductor as the processor while the other is in or near the cache. By splitting the cache interface, the processor is able to control programming most of the features of the cache interface that are important and local to the processor. Meanwhile, the cache interface controls the features that are important and local to the cache. This will become more apparent in the discussion about FIG. 2. Alternatively, the cache interface could comprise one or more portions that are located at any spot or spots on the semiconductor that are able to meet timing and other requirements, such as power, routing density.

Turning now to FIG. 1, this figure illustrates one possible configuration for a semiconductor package using a preferred embodiment of the present invention. Semiconductor package 100 comprises a processor 130 that is connected to two SRAM or DRAM caches 110 and 120 through busses 150 and 160, respectively. There are two SRAM or DRAM caches to afford processor 130 with a wider bus (and, consequently, data rate) between the cache and the processor. The cache interface for cache 110 is preferably comprised of two portions, a cache portion 180 and a processor portion 133. Likewise, the cache interface for cache 120 is preferably comprised of two portions, a cache portion 190 and a processor portion 136. These portions will be discussed in more detail in reference to FIGS. 2 and 3.

Semiconductor package 100 also comprises a second processor 140 that is connected to two SRAM or DRAM caches 115 and 125 through busses 155 and 166, respectively. Again, there are two SRAM or DRAM caches to afford processor 130 with a wider bus (and, consequently, data rate) between the cache and the processor. The cache interface for cache 110 is preferably comprised of two portions, a cache portion 185 and a processor portion 143. The cache interface for cache 125 is also preferably comprised of two portions, a cache portion 195 and a processor portion 146.

Thus, semiconductor package 100 has two processors, each processor connected to two SRAM or DRAM caches. Each cache and cache interface preferably supports Single Data Rate (SDR) and/or Double Data Rate (DDR) interfaces, which are industry-standard cache interfaces. As is known in the art, data is transferred from or to the cache on an edge of a clock (not shown in FIG. 1) in the SDR interface. In the DDR interface, data is transferred on both the rising and falling edge of the clock. The cache interface, as per the DDR and SDR specifications, provides one or more "echo" clocks (not shown in FIG. 1) that are driven from the cache interface back to the processor. These clocks improve timing between the processor and the cache.

It is expected that semiconductor package 100 will be placed in a computer system, complete with other levels of memory, including potentially other levels of cache memory, hard drives, input/output devices, network connections, etc.

It should be noted that the caches and the cache interfaces shown in FIG. 1 could be combined from two caches for each processor to one larger cache per processor to provide the necessary bus width. In addition, many other features that would be in a normal semiconductor chip are not shown in FIG. 1. For instance, the L1 cache in each processor is not shown, the busses that communicate off-chip with memory and input/output devices are not shown, and the busses that interconnect the L2 caches are not shown. Furthermore, the block diagram of FIG. 1 is layout simplistic in that the processor and cache are distinctly separate locations in the figure, whereas the functionality of each block may be spread out in semiconductor area and is not relegated to certain blocks of area. FIG. 1 simply illustrates some of the salient features of the current invention and one preferred embodiment for the current invention.

In addition, each of the blocks as shown may reside on separate semiconductors, or all blocks may reside on one large semiconductor. Package 100 may also be broken into individual packages, each containing one or more parts of FIG. 1. Furthermore, it is preferred that processor portions 133, 143, 136, and 146 of the cache interface not be changed, regardless of whether SRAM or alternately DRAM is used in SRAM or DRAM L2 caches 110, 115, 190, and 195. This provides the benefit that the processor portion of the cache interface can interface with a variety of caches that have different sizes, speeds, and memory types (SRAM or alternately DRAM). Additionally, when SRAM is used in the L2 cache, there may be multiple SRAM caches for each cache 110, 115, 120, and 125, due to access speed, bandwidth, or other considerations.

It should also be noted that the term "SRAM or DRAM L2 cache" should be interpreted as meaning "SRAM or alternately DRAM L2 cache," as one RAM or the other would be chosen for the cache. While it is possible to have one cache that has both types of RAM, in particular having SRAM buffers on a primarily DRAM cache, the term "cache memory" is used herein to denote the actual bits and locations used to store the information from main memory (or to be transferred to main memory). The term is not used to denote intermediary stages that are used as copies of the information in the cache memory. For instance, in U.S. Pat. No. 5,895,487, by Boyd et al. (hereinafter, "Boyd"), entitled "Integrated Processing and L2 DRAM Cache," an L2 cache memory having both SRAM and DRAM is disclosed. However, the SRAM portion of the cache is essentially a fast buffer that contains copies of information in the DRAM. The DRAM portion is the portion that stores the actual information, while the SRAM portion is simple a copy of the DRAM portion. Under this definition, the SRAM/DRAM cache in Boyd is a DRAM cache.

Figure 2:
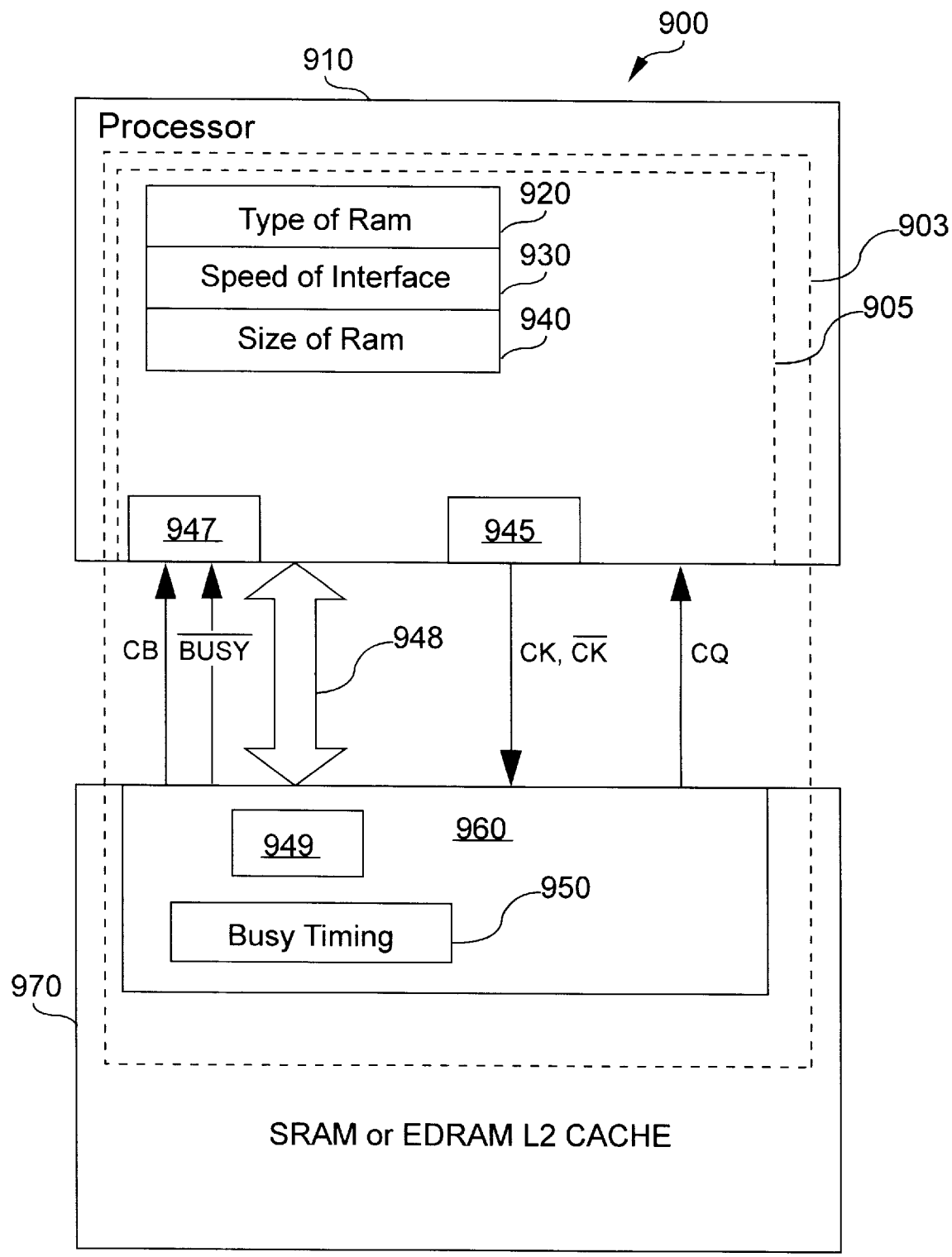
FIG. 2 is a block diagram of the portions of a preferred cache interface embodiment, as the portions exist on a processor and a cache.

Referring now to FIG. 2, this figure is a closer examination of the cache interface between one processor and an SRAM or DRAM cache. The cache interfaces between this processor and additional caches are not shown. Processor 910 comprises a processor portion 905 of a cache interface, while SRAM or DRAM cache 970 comprises a cache portion 960 of the same cache interface. Cache interface 903 thus comprises two portions, portion 905 and 960. Processor cache interface portion 905 comprises three indications: type of RAM 920; speed of interface 930; and size of RAM 940. Processor cache interface portion 905 additionally comprises an L2 cache controller 947 and a clock divider 945. Processor 910 communicates with SRAM or DRAM cache 970 through bus 948, a busy indication (which is preferably active low), clocks (CK and CK') and echo clocks (CQ and CB). The busy indication and the echo clock for the busy signal preferably are routed to the L2 cache controller 947, through receivers, latches, etc., as is known in the art. Any mechanism known to those skilled in the art for configuring processor interface portion 905 to receive and act on the busy indication is applicable to the current invention. These mechanisms will be generally referred to as "receivers," and receivers couple the busy indication from the DRAM and to the processor chip. What is important is that the processor cache portion can act on the busy indication when DRAM is being used as the cache. Equally important is the ability to disable the busy indication and busy clocks when SRAM is being used as the cache. Structures and methods for enabling and disabling signals external to a semiconductor chip (or internal to the chip, if the cache is on-chip) are well known to those skilled in the art.

SRAM or DRAM L2 cache 970 comprises a directory (also called a tag RAM) 949, the cache portion 960 of cache interface 903, and a busy timing indication 950. SRAM or DRAM L2 cache 970 preferably supports associativity, although associativity is in no way required.

Although not shown in FIG. 2, it is beneficial and preferred that type of RAM 920, speed of interface/cache 930, and size of RAM 940 indications be placed in L2 cache controller 947, along with their supporting logic (such as clock divider 945). This allows the cache controller to be a distinct mechanism that controls most or all of the processor's 910 interaction with the cache 970. In this embodiment, L2 cache controller 947 and processor interface portion 905 would then become the same mechanism. FIG. 2 does illustrate, however, that this functionality may be placed outside of the cache controller, if desired, as long as the cache controller and the indications are coupled when needed. In particular, the cache controller will likely need to know the size of RAM 940 indication. For the type of RAM 920 indication, the type of RAM 920 indication enables or disables the busy indication and busy clock, which then are routed to the L2 cache controller. Thus, this could occur outside the cache controller. Speed of interface/cache 930 could also occur outside the cache controller, as this would likely be fed into the cache controller for proper timing.

The most preferred embodiment of the present invention comprises a pipelined memory interface, such as that described in Irish. For pipelined caches, both the processor portion 905 and the cache portion 960 of cache interface 903 must support pipelining. The processor portion 905 of the cache interface 903 would support pipelining, as it would be issuing reads and writes in advance of when the read and write actually occurs, as described in Irish. When the cache portion 960 of cache interface 903 "busies" the processor (by asserting the busy signal), a busy indication is added to the pipeline. The busy indication is then asserted when the pipelined data transfer occurs. Timing for the busy indication is described in more detail below.

In the most preferred embodiment of the present invention, a class scheme disclosed in the copending application by Krolak is preferably used. L2 cache controller 947 using the invention disclosed in the Krolak application would already have cache miss logic (not show separately in FIG. 2) in L2 cache controller 947, and the busy indication would be routed to and act as a logical extension of the class miss logic. The cache miss logic, for L2 caches that are pipelined, generally comprises a portion of a tag pipe logic and a data pipe logic. The tag pipe logic determines class misses, while the data pipe logic issues reads, writes, and retries, as is known in the art.

The busy indication acts logically like a class miss, and may be thought of a s being "or-ed" with a class miss. The sequence of events for the pipeline, as controlled by the data pipe logic of L2 cache controller 947, would be the same for both an L2 class miss and a busy indication. The processor (as directed by the data pipe logic), for both an L2 class miss and a busy indication, would retry the access again. The steps involved with waiting for new data to come through the pipeline, discarding the old (and bad) data, and clearing the pipeline, would be the same for both a class miss and a busy. The timing of when the steps start is, however, different. The tag pipe logic can determine a class miss fairly quickly, as it has access to a local tag RAM (also called a directory) and can perform lookups in the tag RAM quickly. The busy signal will, however, be asserted when the data access that has been busied makes it through the pipeline. Thus, the busy indication is delayed until the data transfer between the cache and the processor occurs, while a class miss will be discovered, by the tag pipe logic, sooner. Once the tag pipe logic determines a class miss or receives the busy signal, it informs the data pipe logic, which then schedules a retry of the access that was missed or busied. Essentially, the cache controller (and the processor cache interface portion) directs the processor to retry the access.

The indications (920, 930, 940, and 950) are preferably registers that contain one or more bits and that are initialized at startup. If desired, these could be "hard coded" by connecting the bits of the registers to ground or to power to create the correct codes in the registers.

Type of RAM indication 920 indicates the type of cache RAM (either SRAM or DRAM) that is used in SRAM or DRAM L2 cache 970. Speed of interface indication 930 indicates the speed of the cache portion 960 of the cache interface, which also indicates the speed (in terms of the clock frequency) at which data can be transferred to and from SRAM or DRAM cache 970. It should be noted, however, that SDR and DDR transfer indications are discussed elsewhere. It is preferred that speed of interface indication 930 be programmed as a clock divisor. Clock divider 945 then takes the clock for the processor (not shown in FIG. 2) and divides this clock by the clock divisor to generate clocks CK and CK' (the inverse of CK, which is indicated with a bar over CK in this and other figures), which are inputs to cache portion 960 of cache interface 903. Clock dividers are well known to those skilled in the art, and any mechanism able to change the speed of an input clock to create an output clock at a different (or the same) speed may be used as clock divider 945. By providing this clock changing mechanism, faster or slower speed SRAMs or EDRAMs may be used without changing the cache interface.

Size of RAM indication 940 preferably delineates the "depth" of SRAM or DRAM L2 cache 970. For instance, if the RAM has 64K (where K is a power of two, being 1024) locations, then the number 64 or the number 65,536 (64K)

would be placed into size of RAM indication 940. This number preferably does not indicate the "width" of the cache RAM. For instance, if bus 948 is 16 bytes wide, the size of RAM indication 940 would preferably not indicate this size. Size of RAM indication 940 could be shortened to a number that correlates with the size of the RAM. For instance, the number zero could indicate 64K, while the number one could indicate 128K. Size of RAM indication 940 is preferably a register that acts as a limit on the size of the cache. This number then provides the processor and the operating system with the size of the cache. The processor and the operating system know the size of the cache and know the amount of data that is allowed to be placed in the cache.

Directory 949 and the directory (not shown in FIG. 2) in the L2 cache controller 947 are mechanisms used to track which information is currently in the cache. As is known in the art, the tracking mechanisms are generally "tags", which correlate to physical addresses in main memory. While discussed separately, the directories may be combined into one directory.

Cache portion 960 of cache interface 930 preferably generates a busy indication (in this case, a busy signal) that indicates to processor 910 that an access collision has occurred. The busy signal is valid only when SRAM or DRAM cache 970 is comprised of DRAM. When the SRAM or EDRAM L2 cache 970 is comprised of SRAM, the busy signal is not used. The busy signal and the busy echo clock are routed to the L2 cache controller 947 (and, as described above, the class miss logic internal to the L2 cache controller). Because SRAM does not need refreshing, the busy indication is not used when cache 970 comprises SRAM. The busy signal and echo clock (CB) preferably are unused and do not exist in cache interface portion 960 when SRAM is used as the cache. Furthermore, the signals are not routed to the processor when SRAM is used as the cache. The receivers on the processor portion of the cache interface for these signals, if processor 910 is on a separate semiconductor chip, still preferably exist. These receivers may be tied high or low when SRAM is used. Additionally, the routing of the signals from the receivers to the interals of the processor preferably still exist, but the receivers are preferably disabled and the output of the receiver made to output an inactive busy indication. Regardless of whether or not these signals are tied (externally or internally to the processor chip) to a particular voltage level, when SRAM is used as the cache, L2 cache controller 947 simply ignores the busy indication and the busy echo clock.

When SRAM or DRAM cache 970 is comprised of D RAM, the DRAM cache is able to be in one of a plurality of states. An access collision between an access (a read or a write to the DRAM c ache) generated by the processor and the DRAM cache is caused because the DRAM cache is in a precharge, initialization, refresh, or standby state. Precharge occurs after a read or write to an address has occurred, and is the time for the bits at the location to be charged to the correct potential. Refresh occurs when an address is recharged. Refresh preferably occurs independently of the processor and cache interface. In other words, neither the processor nor the cache interface control the refresh. The DRAM itself preferably controls refresh. Other mechanisms are possible, however, and are discussed in reference to FIG. 3. Initialization occurs right after power is applied to the chip. This period allows registers to be programmed, logic to be reset, etc. Standby is a power-saving mode wherein minimal refreshes are preformed. When the RAM cache is in any of these states, the DRAM cache cannot accept any new information or retrieve any information from the cache.

However, for caches that support associativity, there are instances when an access could be followed immediately by another access. When a cache supports associativity, the cache is divided into two or more banks, as indicated by one or more class bits. For four-way associativity, the cache is divided into four banks (indicated by two class bits). When there is an access to a location in one bank, one of the other three banks may be accessed during the next cycle with no precharge penalty. The bank that was recently accessed cannot, however, be accessed again until after the precharge period. Because of the benefit provided during situations as just described, it is preferred that DRAM caches support associativity.

Cache portion 960 of cache interface 930 received clock CK and CK' and uses these to generate echo clocks CQ and CB. This is discussed in more detail in reference to FIG. 3. Cache portion 960 of cache interface 930 preferably also comprises busy timing indication 950. Busy timing indication 950 indicates the timing of the busy signal, which, in particular, is referenced to clock CK. Busy timing indication 950 indicates whether the busy indication is adjusted and valid at the rising edge or the falling edge of clock CK. Timing of the busy indication is described in more detail in reference to FIG. 3.

What has been disclosed so far is a cache interface for cache memory that supports both DRAM and SRAM caches. The cache interface is preferably split into two portions, one portion on/near the processor and the other on/near the cache, but may be one portion with some or all of the discussed functionality. Providing a cache interface that is programmable and that supports both SRAM and DRAM gives a designer quite a bit of flexibility and allows the designer to select the best system for his or her application without having to completely redesign the cache interface on the processor.

Figure 3:
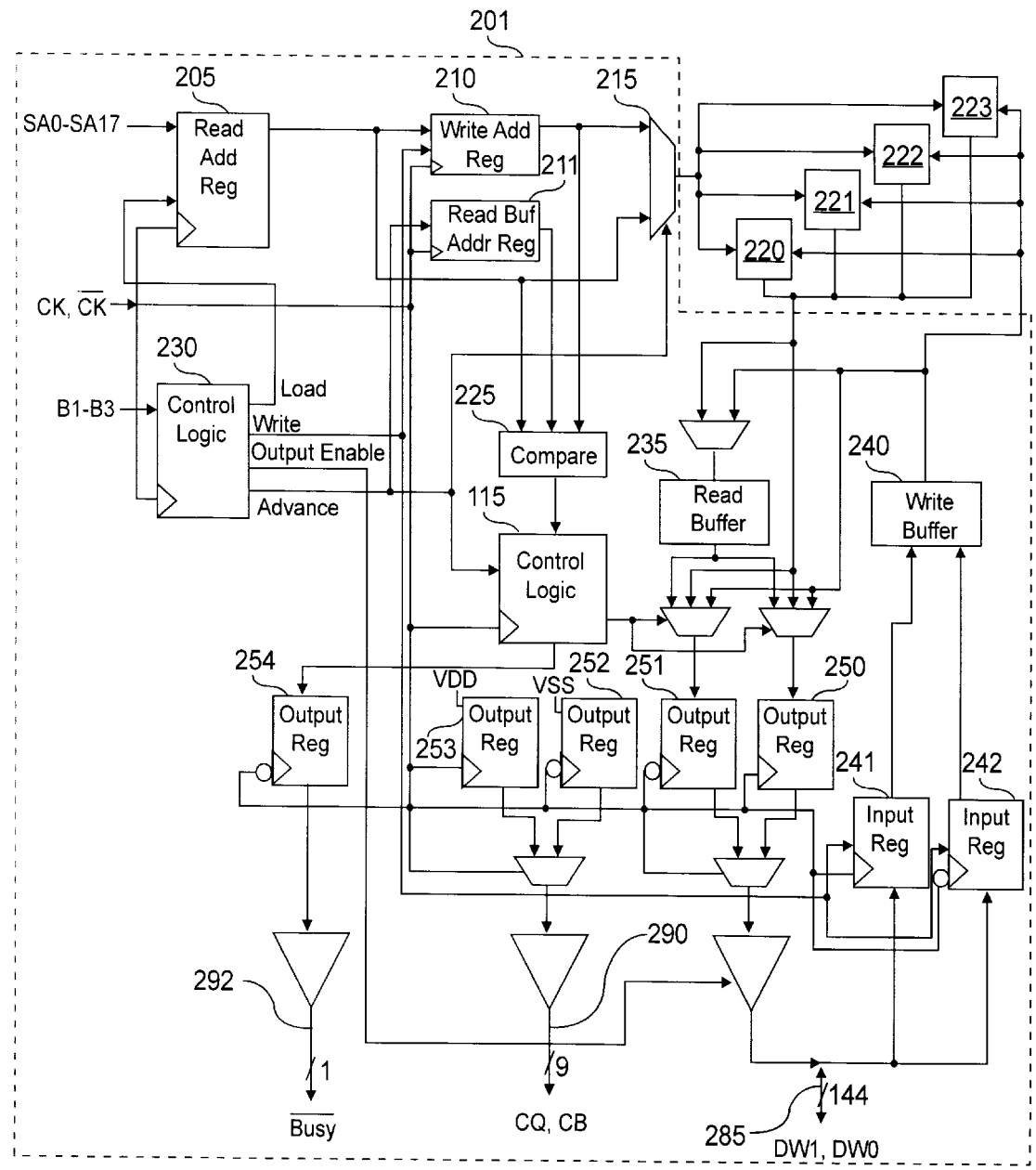
FIG. 3 is a circuit diagram of the cache portion of a cache interface when the interface is coupled to DRAM in accordance with a preferred embodiment of the present invention.
Figure 4:
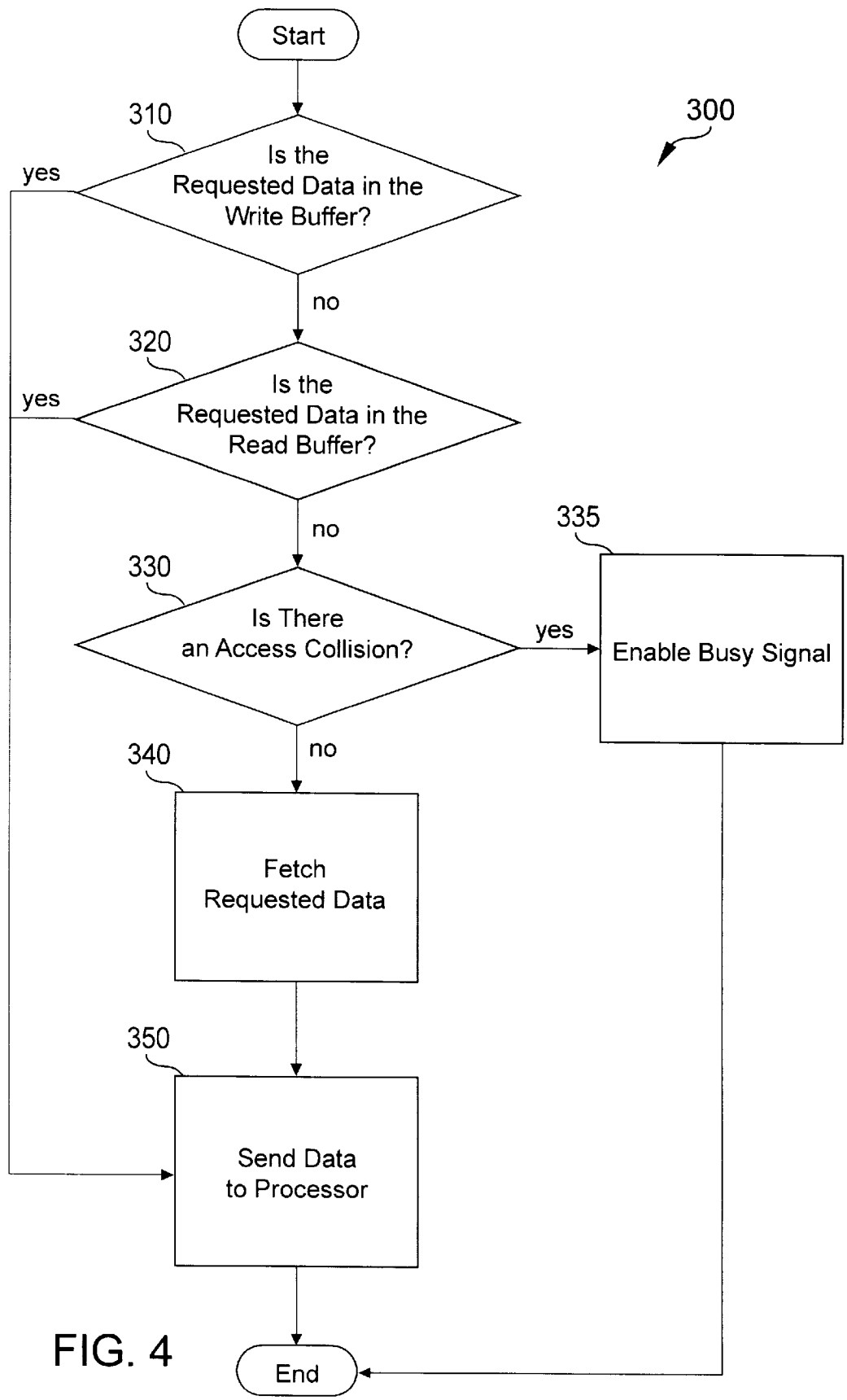
FIG. 4 is a logical flow diagram in accordance with a preferred embodiment of the present invention of a processor read cycle for a cache portion of a cache interface that is interfaced with a DRAM.
Figure 5:
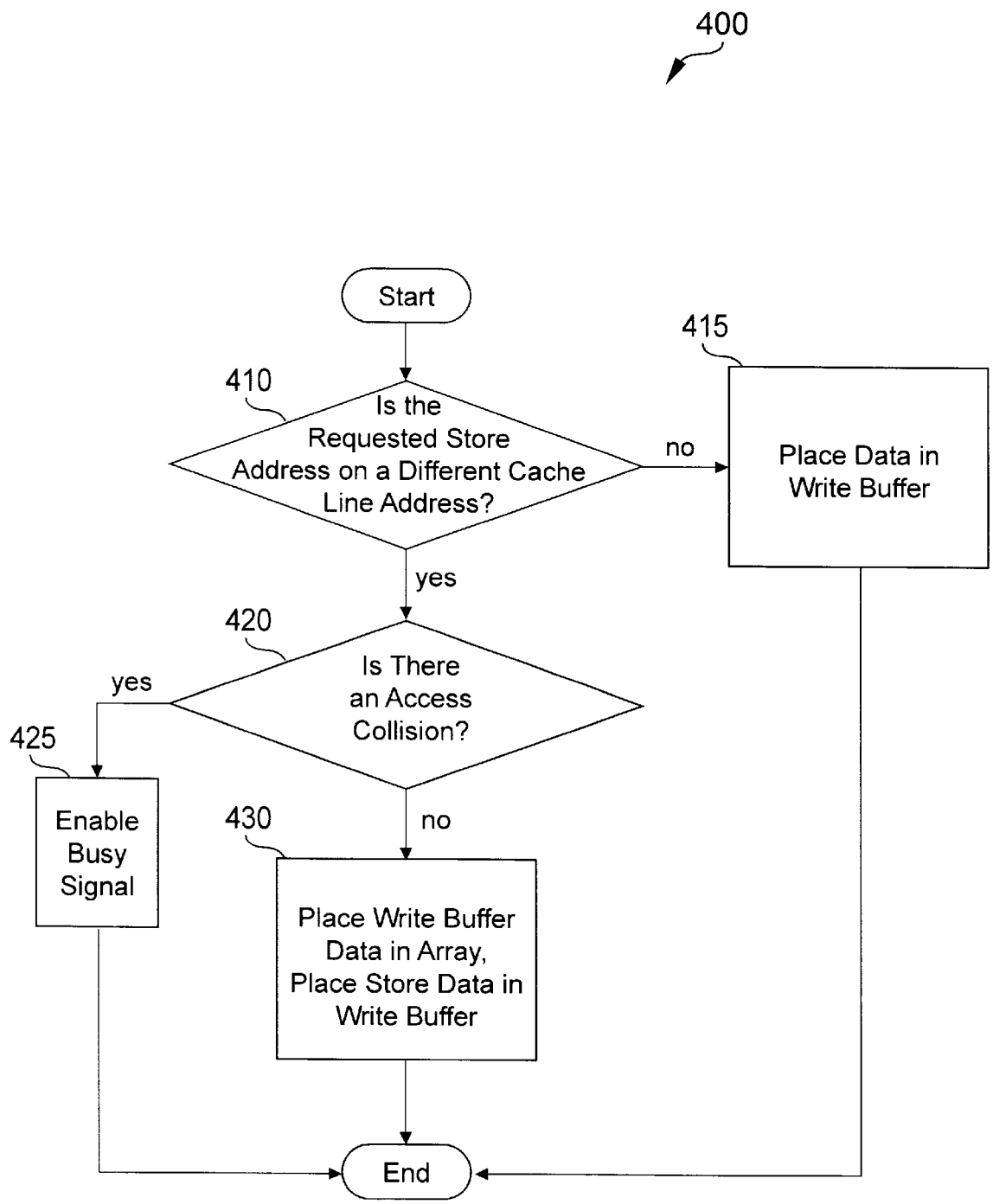
FIG. 5 is a logical flow diagram in accordance with a preferred embodiment of the present invention of a processor write cycle for a cache portion of a cache interface that is interfaced with a DRAM.
Figure 6:
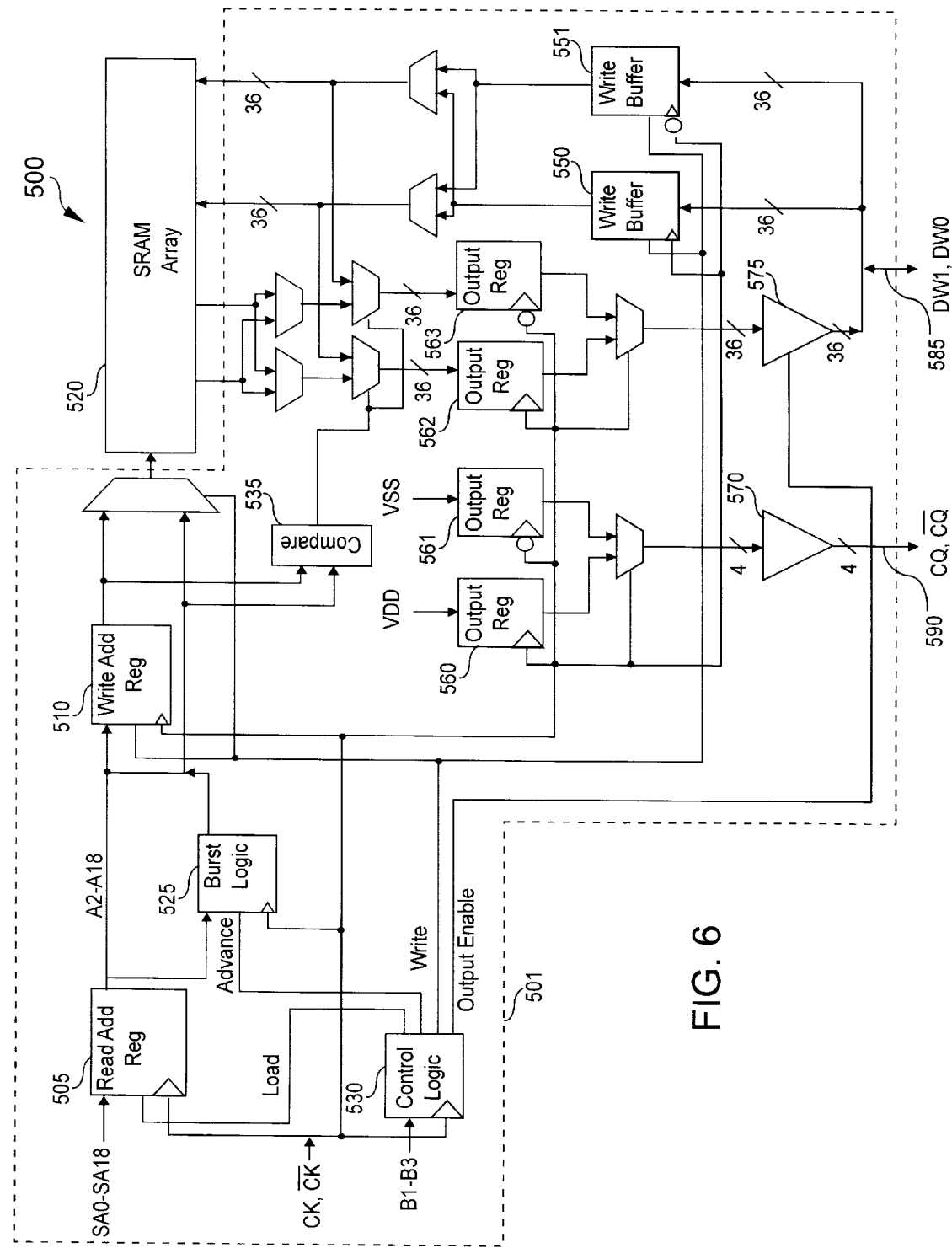
FIG. 6 is a circuit diagram of the cache portion of a cache interface when the interface is coupled to SRAM in accordance with a preferred embodiment of the present invention.

In FIGS. 3 through 5, SRAM or DRAM L2 cache 920 (shown in FIG. 2) will be described as being implemented in DRAM, and one possible DRAM cache interface for the DRAM cache will be discussed. In FIG. 6, SRAM or DRAM L2 cache 920 (shown in FIG. 2) will be described as being implemented in SRAM, and one possible SRAM cache interface for the DRAM cache will be discussed.

Turning now to FIG. 3, the cache portion of the cache interface is shown in greater detail when it interfaces with DRAM. In terms of FIG. 2, SRAM or DRAM cache 970 (shown in FIG. 3 as DRAM cache 200) comprises four separate DRAM cache arrays 220, 221, 222, and 223 and cache interface portion 201. DRAM cache 200 preferably supports pipelining, although pipelining is not explicitly shown for simplicity. Differences between support of DRAM and support of SRAM will be related in reference to FIG. 6. It is preferred that DRAM arrays 220, 221, 223, and 223 and cache interface portion 201 meet the Single Date Rate (SDR) and Double Data Rate (DDR) interface specifications. Cache 200 communicates with a processor (not shown) over bus 285. Address bits SA0 through SA17 (18 bits in this example, for a total of 256K locations) are received from the processor. Also received from the processor are the clocks, CK and CK', and bits B1–B3, which indicate the interaction between the processor, cache interface, and cache, as discussed in more detail below.

To support DRAM, cache interface portion 201 comprises some enhancements that are not really necessary for SRAM. In particular, read buffer address register 211, read buffer 235, and busy indication 292 (including its output register 254) are enhancements not necessary for SRAM. A cache interface portion that interfaces with SRAM and that does not use these enhancements will be shown in FIG. 6.

Control logic 230 controls whether cache interface portion 201 reads or writes, some of the internal timing, and whether a SDR transfer or a DDR transfer occurs. This is explained in more detail below. There are preferably at least four signals generated by control logic 230: load; write; output enable; and advance. The load signal is generated during a read request by the processor and it enables read address block 205. The write signal is enabled during a write request by the processor and it enables the input registers 241, 242, and write address register 210. The output enable signal is generated when data is driven onto bus 285 through read buffer 235 and output registers 250, 251. The advance signal is generated to advance control logic 115, read buffer address register 211, and multiplexer 215. Note that there are additional multiplexers, such as the multiplexer on the output of output registers 250 and 251, that are not marked for simplicity. Compare block 225 and control logic 115, which generates busy indication (busy signal 292, in this example) through output register 254, will be discussed later.

Clocks CK and CK' are at a certain speed, preferably as set by size of speed interface indication 930 and clock divider 945 of processor portion 905 of cache interface 903 (as shown in FIG. 2). In general, clock CK and CK' will be half the speed of the processor's clock, although the clocks may run at processor speed, if desired. The DRAM used in DRAM arrays 220, 221, 222, 223 are really the limiting factors in the speed at which the clocks are run. Also, because the array and the cache interface preferably support DDR, faster clocks speeds than half the speed of the processor are not really needed, as DDR is essentially transferring data at the speed of the processor (assuming CK and CK' are set at half the speed of the processor). Cache interface portion 210 produces echo clocks CQ and CB by passing the CK clocks (called the "K" clocks) through output registers 252 and 253. CB is a clock that is synchronized with busy indication 292. The CQ clocks are the SDR and DDR echo clocks that meet the requirements of the industry-standard SDR and DDR interfaces. There is one CQ clock per 18 bits in this example. These echo clocks are preferably running off of the K clocks and continue running during read, write, and no-operation (noop) cycles.

Bus 285, in this example, is 16 bytes wide (with extra bits for error correcting codes and security bits, for a total of 144 bits). The cache portion 201 of the cache interface communicates with DRAM arrays 220, 221, 222, and 223. DRAM arrays 220, 221, 222, and 223 are arrays of bits divided into "lines". Each cache line has a number of bits that is preferably a multiple of bus 285. In this example, the multiple is eight. Thus, each cache line holds 128 bytes, including error correcting codes and security bits, for a total of 1,152 bits per line. Because the processor can read or write only 16 bytes at a time, but the cache line is 128 bytes wide, one cache line can hold eight 16-byte pieces of data. Each piece of data corresponds to one address, because the cache must be able to discern one particular data piece. Thus, each cache line corresponds to a range of addresses and a number of pieces of data. The numbers stated previously are exemplary, only, and may be changed as desired. Preferably, cache portion 201 only reads or writes full lines of information to DRAM arrays 220, 221, 222, and 223. While allowing smaller portions of data to be read or written is possible, this may limit access times due to precharge states.

To support fast accesses, instead of having one DRAM array, there are four DRAM arrays 220 through 223. Each of these arrays operates independently. Splitting a DRAM array is not necessary for the current invention. It merely facilitates achieving SRAM performance from a DRAM cache array. By splitting the array into four blocks, there is less likelihood that the block being read to or written from will be busy due to precharge or refresh. For this particular example, each independent array has a width that is smaller than one cache line, and must be read from or written to several times to retrieve or write, respectively, one cache line. As with most memory, the first read or write can take longer than subsequent reads or writes. Preferably, each array is accessed in parallel during a read. This allows read buffer 235 to contain four cache lines of information from each array. Thus, each cache line for each class is preferably read when the information from one class is requested.

Note that this preferred embodiment may consume too much power for low-power applications, as all four DRAM arrays 220 through 223 are enabled and transferring data at one time. For systems with low power, each DRAM array could be accessed independently, or the four arrays could be made into one large, but slower speed, array.

Thus, read buffer 235 and write buffer 240 preferably are as wide (in bytes and bits) as each cache line. When the processor performs a write to the DRAM arrays 220 through 223, the data is driven on bus 285 while SA0–SA17 are driven with an address and B1–B3 are driven to indicate a write (this is discussed in more detail below). Input registers 241 and 242 latch data and transfer the data to write buffer 240. It is preferred that the processor write each address until the range of addresses for the current cache line are filled. For instance, if the write buffer contains data for addresses zero through 7 (each address holding 16 bytes of data), then it is preferred that the processor start at zero and write the data sequentially through and beyond address eight. Thus, only full cache lines are preferably transferred between the cache and the read/write buffers. The benefit of this embodiment is that, when the cache line address boundary is crossed by a write to the cache interface, write buffer 240 will write to one of the arrays 220, 221, 222, 223. If an immediate write from the processor occurs on the next cycle (or clock edge, if in DDR), the write buffer is free to accept the just-written data without regard to the precharge period caused in the DRAM array by the previous write. If entire cache lines are not transferred, such as if the processor were to write to address zero, then address 22, then address 43, for example, the write buffer would have to write data for the first address (address zero) into the DRAM array as it receives the data for the second address (address 22). When the third address is written to the cache interface, the cache interface would have to enable the busy indication because the write buffer cannot write the data for the second address into the DRAM array due to precharge.

It is preferred that the read also occur as one cache line at a time. In other words, read buffer 235 will read one cache line, and then the processor will preferably access all data elements, which correspond to individual addresses, by accessing a first data element and then sequentially accessing all other data elements, Again, reading data elements and individual addresses sequentially (or reading at least two data elements from the buffer before accessing another cache line) will limit access collisions due to precharge periods.

If it is desired that the processor be able to write or re ad each address randomly such that cache line boundaries are freely crossed, it is possible that read 235 and write 240 buffers be increased in depth. By allowing more cache lines to be stored in the buffers, there should be less access collisions because the buffer can be writting to or reading from the SRAM or DRAM array while accepting or sending, respectively, other data. It should be noted, however, that because the DRAM array is preferably slower than the speed of data exiting and entering the cache interface, the buffers can become full if there are many crossings of cache line boundaries.

It is possible to use deep read or write First-In, First Out (FIFO) buffers, either with or without additional read/write buffers, such as described in U.S. Pat. No. 5,829,026, by Leung, et al., entitled "Method and Structure for Implementing a Cache Memory Using a DRAM Array," to additionally limit access collisions. How ever, one of the advantages of the current invention is the simplicity of the cache interface when dealing with DRAM caches. The current invention has simple buffers and relatively simple clocking schemes. The clocking schemes and buffers of Leung are relatively complex, and large buffers and FIFOs require larger amounts of semiconductor area. This complexity and additional semiconductor area are essentially wasted when DRAM array 220 (and/or 221, 222, 223) is implemented in SRAM, as SRAM generally does not need these clocking schemes and buffers. The current invention, thus, limits useless complexity and semiconductor area when SRAM is used as the cache, and limits complexity and semiconductor area when DRAM is used as the cache.

Note that associativity affects this analysis somewhat. In FIG. 3, which illustrates a DRAM array that supports associativity, access collisions between sequential accesses will occur only if the same bank is accessed in the sequential accesses. For instance, if the processor wishes to write to bank zero then immediately write to bank one, there should be no access collision between these accesses. If, however, the processor wishes to write to bank zero and then write to a different cache line in the same bank before the initial write completes (including precharge), the cache interface will generate an access collision.

When the DRAM array supports associativity, cache interface portion 210 should also support associativity. If desired, two of the address bits SA0 through SA17 may be designated as class bits. Alternatively, two additional bits that are separate from the address bits (and that are not shown in FIG. 3) may be designated as class bits. When the processor has a class miss (and DRAM is being used in arrays 220 through 223), a subsequent read with the correct class bits will not be busied because the bank that contains the correct data is ready to be accessed. For instance, if the processor outputs that it wants to read from class one, but actually wants to read from class two, the cache interface will access the DRAM array for class one, but generate a cache miss. Cache miss logic, as stated previously, is preferably part of the processor portion of the cache interface. The processor will then reissue the read for class two, and the cache interface can read from class two immediately because it is the bank for class one, and not class two, wherein precharge is occurring.

In the most preferred embodiment, read buffer 235 can be made to access data from all banks when the processor requests data from one bank that corresponds to a particular address. In this manner, the read buffer will contain all data from all banks. While a class miss can still occur, when the processor next requests data, the latency associated with accessing one of the DRAM arrays will not occur, as all four cache lines of data from all four classes is in read buffer 235. As stated previously, this would entail the read buffer being able to hold four cache lines of data and being able to read from all banks at the same time. In the example of FIG. 3, each DRAM array's width is smaller than the width of one cache line and is read multiple times to retrieve the correct number of bits for bus 285. In addition, all four arrays are preferably read in parallel to retrieve all four cache lines from all four classes.

For instance, using the previous example, if the processor makes a request for data from class one, but actually wants to read from class two, read buffer 235 will retrieve cache lines from each of the banks in the current associativity scheme. If the DRAM array supports four-way associativity and the lowest two bits of address bits SA0 through SA17 are the class bits, then read buffer 235 would read the cache lines that correspond to addresses X0, X1, X2, and X3, where "X" corresponds to the same upper 16 bits of address. Then, read buffer 235 would have all possible data for all possible banks and there would be no class miss. The read buffer would then hand the correct data over to the processor when the processor requests the correct data for the correct class. In this example, the data from class two is the correct data, and the other three cache lines would be ignored.

Control logic 115 is a large part of cache interface portion 115. Control logic 115 controls busy signal 292, which informs the processor when an access collision has occurred. An access collision occurs, as previously discussed, when a DRAM cache is in a precharge, initialization, refresh, or standby state. During any of these DRAM cache states, control logic 115 asserts busy indication 292 (which, in this example, is a signal that is active low). For control logic 115 to know when the DRAM array is in one of the previous states, there will be some type of communication between the two entities. Generally, this communication will be a signal (note shown in FIG. 3) that informs the control logic when DRAM array 220, 221, 222, and/or 223 cannot refresh.

It is preferred that each DRAM array 220 through 223 maintain its own refresh interval counter and refresh address to enable the DRAM to perform its own refresh. When the K clocks are running, the refresh interval counter preferably runs off the K clocks. When the K clocks stop, the DRAM will preferably switch over to an internal self-generated clock and go into low power standby mode, refreshing as often as necessary to maintain data. Upon noting the start of the K clocks, the DRAM will switch from standby to active mode within a certain number of cycles. When in standby mode, the busy indication will be asserted by control logic 115. Additionally, during initialization (which generally occurs after power on, but could occur anytime if resetting the cache and cache interface is allowed), control logic 115 asserts busy indication 292.

Furthermore, control logic 115 could be made to schedule refreshes for DRAM arrays 220 through 223. However, by allowing the DRAM arrays to schedule their own refreshes, control logic 115 (and cache interface portion 201) does not need to be modified in any way to support SRAM when SRAM is used in arrays 220 through 223. If desired, control logic 115 or another part of cache interface portion 201 may be programmable such that the cache interface portion 201 could control refresh in one programmed state and not perform refresh in another programmed state. Because this adds more complexity to cache interface portion 201, it is preferred that DRAM arrays 220 through 223 control refresh on their own.

If desired, however, cache interface portion 201 may be made to accept refresh commands from the processor through bits B1 through B3 and control logic 230. As discussed below, B1 through B3 have extra combinations that are not used. As such, control logic 230 may be modified to have a particular combination of B1 and B2 that causes the DRAM array to refresh. While this embodiment could potentially reduce access collisions due to precharge and refresh, it also requires the processor to keep track of refresh. Thus, it is more desirable that the processor be freed from tracking refresh and that the DRAM array 220 be responsible for carrying out refresh.

Concerning bits B1 through B3, the following table indicates the interaction between the processor, cache interface portion 201 and DRAM arrays 220 through 223:

When the K clock rises, the following happens:
    Address and command are latched in. If previous operation was a non-busied store, data is latched in to the store buffer.
    If B1 = '0' and B2 = '1' (Fetch):
        If the selected bank of the array is "free", it is accessed, the data is moved to the fetch buffer and the fetch buffer is marked valid. Meanwhile, a compare between the address in the buffers and the requested address is done. If the array was free, or the fetch address matched the fetch buffer address, busy is shut off at fall of K after the next rising K (1.5 cycles later), and data multiplexers are set up to move data properly at the fall/rise pair after the next rising K (again, 1.5 cycles later); else busy is turned on at the fall of K after the next rising K. Note that the timing of busy may be modified by busy indication 950, shown in FIG. 2, to be enabled/disabled at the rising edge of K instead of the fall of K, if desired.
        Also, if the fetch address matched a valid store buffer entry, the store entry is moved to the fetch buffer and to the outputs to keep the data coherent.
    If B1 = '0' and B2 = '0' (Store):
        If current store address is not equal to store buffer address, and array is free, store buffer is moved to the array and busy is shut off at fall of K after the next rising K. Store buffer is made ready to accept the store data next cycle.
        Or if current store address matches valid store buffer address, get ready to latch in data next cycle, and busy is shut off at fall of K after the next rising K.
        Else busy is turned on at fall of K after the next rising K. Note that the timing of busy may be modified by busy indication 950, shown in FIG. 2, to be enabled/disabled at the rising edge of K instead of the fall of K, if desired.
    If B1 = '1' and B2 = 'X' (Noop):
        Finish pipelined operations, busy is turned on at fall of K after the next rising K. Note that the timing of busy may be modified by busy indication 950, shown in FIG. 2, to be enabled/disabled at the rising edge of K instead of the fall of K, if desired.
        A noop (no-operation) should not be construed as an opportunity to move the store buffer into the array.
When the K clock falls, the following happens:
    DDR fetch or store data is moved appropriately per the pipeline state.

As shown above, there are three states, but four possible choices of B1 and B2. The fourth state could be implemented as processor control of refresh, or an "increment and continue" operation, or other operations as known by those skilled in the art.

Additionally, bits B1 through B3 act in concert to indicate synchronous functions. The synchronous functions of cache interface portion 201 are controlled by B1 through B3, which are captured or latched on the rising edge of clock K. The synchronous functions are described in the following clock truth table (the "n" refers to the current rising edge, "n+1" refers to the next rising edge of clock K, "n+1.5" refers to the falling edge after that, and "n+2" refers to the rising edge after that):

| K | B1 (n) | B2 (n) | B3 (n) | DQ (n) | DQ (n+1) | DQ (n+1.5) | DQ (n+2) | Mode |
|---|---|---|---|---|---|---|---|---|
| L->H | L | L | L | X | X | Douta | Doutb | DDR Read |
| L->H | L | L | H | X | X | Douta | Douta | SDR Read |
| L->H | L | H | L | X | Dina | Dinb | X | DDR Store |
| L->H | L | H | H | X | Dina | Dina | X | SDR Store |
| L->H | H | L | X | X | X | Hi-Z | Hi-Z | Noop |
| L->H | H | H | X | X | X | Hi-Z | Hi-Z | Reserved |

Turning now to FIG. 4 in addition to FIG. 3, FIG. 4 shows a logical diagram of the routing of data that occurs when the processor requests a read from cache interface portion 201 and DRAM arrays 220 through 223. FIG. 4 is not meant to be construed as a sequence of events, as many of the steps shown in FIG. 4 occur in parallel. The previous tables give a better indication of the timing of the events shown in FIG. 4. FIG. 4 does, however, aid in understanding the invention, as it show the routing of data through cache interface portion 201. Flow diagram 300 is performed whenever the processor performs a request for data (a fetch in the above tables).

After (or contemporaneously with) the processor's request for a read, the cache interface portion 201 determines if the requested data is in the write buffer (step 310) or in the read buffer (step 320). To do this, compare circuitry 225 compares the address from read address register 210 with the address in read buffer address register 211 and the address in writer address register 210. If the address in read address register 205 matches the address in write address register 210 (step 310=yes), the data is in write buffer 240. As stated previously, because read buffer 235 and write buffer 240 preferably contain at least one cache line and a cache line preferably can contain data from multiple addresses (because the width of bus 285 is much less than the width of a cache line), the processor can read or write the respective buffer multiple times for each read by the read buffer of DRAM arrays 220 through 223 or each write by write buffer 240 to arrays 220 through 223. In the case when the write buffer has the requested data for the requested address, control logic 115 (in concert with control logic 230) routes data from write buffer 240 through a multiplexor, through the multiplexors located beneath read buffer 235 in FIG. 3, through output registers 250, 251, through another multiplexor, through a driver, and onto bus 285 (step 350).

If the addresses in the read address register 205 and the write address register 211 do not match (step 310=no), the cache interface portion 201 checks to see if the requested data is in the read buffer. Note that if data corresponding to one address is in both the read and the write buffers, the data from the write buffer will be chosen. This is for data coherency reasons (if the data is being read and written to the same address contemporaneously, it is assumed that the data being written is newer than the data being read). Compare circuitry 225 compares the address in read address register 205 with the address in read buffer address register 211. If there is a match (step 320=yes), control logic 115 (in concert with control logic 230) routes the data from read buffer 235, through the multiplexors, through output registers 250, 251, through another multiplexor, through a driver, and onto bus 285 (step 350).

Control logic 115 determines if there is an access collision. As stated above, access collisions are caused whenever the DRAM cache is in a precharge, initialization, refresh, or standby state. In the most preferred embodiment, the control logic is coupled to the DRAM arrays 220 through 223 to determine if the DRAM cache is in one of these states. Having the processor write and read entire cache lines (which takes multiple writes and reads, respectively, of data to and from the cache) improves performance in terms of the number of precharge collisions that occur. Additionally, an associative DRAM array also improves performance in terms of a decrease in the number of precharge collisions that occur.

If control logic 115 determines that an access collision has occurred (step=330 yes), the control logic enables the busy indication (in this case, a busy signal) in step 335. The busy signal informs the processor that it must retry its read. The timing for the busy signal has been previously described.

If the data is not in the read or write buffers (steps 310 and 31 both=no) and there is no access collision (step 330=no), control logic 115 directs the read buffer to fetch (step 340) a cache line corresponding to the address and data from arrays 220 through 223. After the data is fetched, the control logic control logic 115 routes the data from read buffer 235, through the multiplexors, through output registers 250, 251, through another multiplexor, through a driver, and onto bus 285 (step 350).

Referring now to FIG. 5 in addition to FIG. 3, FIG. 5 shows a logical diagram of the routing of data that occurs when the processor requests a write to cache interface portion 201 and DRAM arrays 220 through 223. FIG. 5 is not meant to be construed as a sequence of events, as many of the steps shown in FIG. 5 occur in parallel. The previous tables give a better indication of the timing of the events shown in FIG. 5. FIG. 5 does, however, aid in understanding the invention, as it show the routing of data through cache interface portion 201. Flow diagram 400 is performed whenever the processor performs a request to write data (called a store in the above tables).

It should be noted that in the most preferred embodiment of the current invention, the processor writes a complete cache line (which comprises a plurality of addresses) to the cache interface before proceeding to a different cache line. In this embodiment, the flow diagram of FIG. 5 is really not applicable, as access collisions should not occur during writes. Write buffer 240 should be able to write the cache line into the appropriate cache line for DRAM arrays 220 through 223 before the processor writes to another cache line. The write buffer will then be empty and able to accept the new write to the other cache line from the processor. Thus, flow diagram 400 is meant for those embodiments that do not guarantee that at least two data elements (corresponding to two addresses) will be written to the write buffer before the cache line boundary (an address boundary) is crossed. Note that this can also occur if the width of a cache line in the write buffer and the array is the same as the width of data bus 285, as each access to the DRAM array should cause an access collision due to precharge. This is particularly true if the DRAM array is not associative, and is somewhat ameliorated by having an associative array.

Flow diagram 400 begins after (or contemporaneously with) the processor's request for a write. Flow diagram 400 starts in step 410 when the cache interface portion 201 determines that the requested store address is on a different cache line address than as indicated by the range of addresses corresponding to write buffer 240. For instance, if each cache line holds 128 bytes and bus 285 is 16 bytes wide, each cache line can hold data from eight addresses. Thus, each cache line preferably corresponds to a range of addresses. If the store address is within the range of addresses of the cache line in the write buffer (step 410=no), then control logic 115 (in concert with control logic 230) enables input registers 241, 241 to place data in write buffer 240 at the appropriate location corresponding to the current address (step 415).

If the store address is not within the range of addresses of the cache line in the write buffer (step 410=yes), control logic 115 determines if there is an access collision due to precharge or recharge or any other condition (step 420). For instance, if bank two of four, in a scheme where the DRAM array supports four-way associativity (as shown in FIG. 3), was just written to, an immediate access to the same bank will cause an access collision due to precharge. If there is an access collision (step 420=yes), control logic 115 enables the busy signal (step 425).

If control logic 115 determines that there is no access collision (step 420=no), control logic 115 (in concert with control logic 230) causes data to be written from write buffer 240 into arrays 220 through 223, and the new data from write buffer 240 from input registers 241, 242 to write buffer 240. This occurs in step 430.

The previous discussion refers mainly to a DRAM array (as shown in FIG. 3). For an SRAM array, the cache interface portion on the processor (portion 905, as shown in FIG. 2) preferably stays exactly the same as this portion of the cache interface would be for a DRAM array. However, busy signal 292 (shown in FIG. 3) is simply ignored by the processor. Additionally, the input to the processor for the signal could be tied high (if the busy indication is active low) to ensure that the signal is disabled. However, even if the signal is not tied to a particular logic value, the processor will still ignore the busy indication, as busy is not needed when the cache is implemented with an SRAM array.

Turning now to FIG. 5, this figure shows one potential embodiment of the current invention wherein SRAM is used as the cache array. SRAM cache 500 comprises SRAM array 520 and cache interface portion 501. Cache interface portion 501 is preferably devoid of many of the enhancements shown in cache interface portion 301 of FIG. 3. The enhancements that were used for DRAM that are not necessary for SRAM include the busy indication (as SRAM is never busy due to refresh, precharge, or other conditions), the read buffer, and the read buffer address register. The read buffer (and read buffer address register) is not used because the SRAM array supports very fast reads, with no danger of access collisions. Write buffers (550 and 551) are still used to enable late writes.

Note that the interface, from the processor's and the processor interface portion's perspective, with cache interface portion 501 is the same as the interface with cache interface portion 301 (of FIG. 3). There are still address bits, clocks CK and CK', control bits B1 through B3, echo clocks CQ and CQ' (although there are fewer clocks in this example), and a data bus. In this example, there is one more bit of address as compared to cache interface portion 301. Also, the data bus 585 is only 72 bits wide. Thus, to get the 144 bit data bus of cache interface portion 301, four SRAM caches 500 must be used.

Cache interface portion 501 is still very similar to cache interface 301 (of FIG. 3). The echo clocks 590 are generated from output registers 560, 561, control logic 530 controls the cache with the same combination of states and timing as previously described, there is a read address register 505, a write address register 510, output registers 562 and 563, a compare block 535, and write buffers 550, 551 (not shown, but present, would be the registers for the write buffers). Burst logic 525 in this example routes address bits A0 and A1 through control logic, as these are class bits. A similar implementation could, and likely would, be used in cache interface portion 301 (performed by control logic 115). Note that cache interface portion 501 will direct data from the write buffers 550, 551 to data bus 585 if a processor requests a read from an address that is currently stored in the write buffer.

SRAM cache 500 supports all other previously discussed functionality as supported by cache 300 of FIG. 3, such as pipelining, SDR and DDR interfaces, classes and associativity, and timing requirements. From the processor's perspective, it cannot tell whether DRAM or SR AM is being used as the cache. Note that the busy indication for the two embodiments will, however, differ. For DRAM, the busy indication is used to indication an access collision; in SRAM, the processor and the processor cache interface portion will ignore the busy signal.

As the previous figures illustrate, a cache interface that supports both SRAM and Dynamic Random Access Memory (DRAM) is disclosed. The interface allows a systems designer to choose the type of RAM by changing a type of RAM indication. The cache interface is kept simple when DRAM is used as the cache, in that a busy indication is asserted so that the processor knows when an access collision occurs between an access generated by the processor and the DRAM cache. An access collision occurs when the DRAM cache is unable to read or write data due to a precharge, initialization, refresh, or standby state. When the cache interface is used with an SRAM cache, the busy indication is preferably ignored. Furthermore, the disclosed cache interface allows speed and size requirements for the cache to be programmed into the interface. In this manner, the processor portion of the cache interface does not have to be redesigned for use with different sizes or speeds of caches.

Although the current invention has been discussed in reference to L2 caches, the invention is equally applicable to other levels of cache, such as L3, L4, etc., or to main memory.

While the invention has been particularly shown and described with reference to preferred embodiments thereof, it will be understood by those skilled in the art that various changes in form and details may be made therein without departing from the spirit and scope of the invention.

What is claimed is:

1. A processor having a memory interface for providing an interface between the processor and a memory, wherein the memory interface is configured to interface with a first memory and alternately with a second memory having a busy indication, wherein the memory interface ignores the busy indication if the memory comprises the first memory and the memory interface directs the processor to retry an access if the memory comprises the second memory and the busy indication is asserted.

2. The processor of claim 1 wherein the memory comprises a static Random Access Memory (RAM) cache and the memory interface ignores the busy indication.

3. The processor of claim 1 wherein the memory comprises a dynamic RAM cache having the busy indication, wherein the busy indication is coupled to the memory interface, and wherein the dynamic RAM cache asserts the busy indication when there is an access collision between an access generated by the processor and the dynamic RAM cache, the busy indication informing the processor that the processor needs to retry its access.

4. The processor of claim 3 wherein the dynamic RAM cache is coupled to a clock and further comprises a busy timing indication that allows the busy indication to be asserted on a rising edge of the clock or on a failing edge of the clock.

5. The processor of claim 3 wherein the dynamic RAM cache is able to be in a plurality of states and wherein the access collision is caused because the dynamic RAM cache is in a precharge, initialization, refresh, or standby state.

6. The processor of claim 1 wherein the memory comprises cache memory that is divided into a plurality of banks, each bank corresponding to a class and comprising a plurality of cache lines.

7. The processor of claim 6 wherein the cache memory comprises dynamic RAM cache memory having a cache interface that comprises the busy indication, wherein data from a cache line in each of the banks of the dynamic RAM cache memory is fetched by the cache interface whenever the processor requests data from one of the cache lines of one of the classes.

8. The processor of claim 3 wherein the dynamic PAM cache comprises a dynamic RAM cache memory that comprises a plurality of lines able to contain data, wherein the dynamic RAM cache further comprises a read buffer that comprises a copy of data from the dynamic RAM cache memory, and wherein at least a portion of the copy of data is fetched an d output to the processor when the processor requests the portion of data from the dynamic RAM cache memory.

9. The processor of claim 1 wherein the memory comprises a cache that comprises a plurality of cache lines, each cache line corresponding to a range of addresses, wherein the cache further comprises a write buffer that comprises data corresponding to one of the cache lines, and wherein at least a portion of the data is output to the processor when the processor requests data from an address that falls within the range of addresses that corresponds to the data in the write buffer.

10. The processor of claim 1 wherein the memory comprises a cache that has a cache memory that comprises a plurality of cache lines, each cache line corresponding to a range of addresses, wherein the cache further comprises a write buffer that comprises data corresponding to one of the cache lines, and wherein at least a portion of the data is written to a cache line in the cache memory that corresponds to a particular address range if the processor requests a write to an address that is not in the particular address range.

11. The processor of claim 1 wherein the memory comprises a cache and wherein the memory interface comprises a cache interface that further comprises a size of RAM indication that allows the cache interface to interface with caches of various sizes.

12. The processor of claim 1 wherein the memory interface comprises a cache interface, the memory comprises a cache, the first memory comprises a Static RAM cache, and the second memory comprises a dynamic RAM cache, wherein the cache interface comprises a type of RAM indication that directs the cache interface to ignore the busy indication if the type of RAM indicator indicates that the cache comprises a static RAM cache and directs the cache interface to direct the processor to retry an access if the type of RAM indicator indicates that the cache comprises a dynamic RAM cache and the busy indication is asserted.

13. The processor of claim 1 wherein the processor operates at a speed, wherein the memory interface comprises a cache interface that comprises a speed of interface indication and a clock divider, wherein the memory comprises a cache, and wherein the clock divider uses the speed of interface indication to divide the speed of the processor and create at least one clock that is coupled to and used by the cache.

14. A method performed on a processor that is coupled to a memory, the method comprising the steps of:
   a) providing a memory interface that is configured to interface with a first memory and alternately with a second memory having a busy indication;
   b) ignoring the busy indication if the memory comprises the first memory;
   c) directing the processor to retry an access to the memory if the memory comprises the second memory and the busy indication is asserted; and
   d) the processor retrying its access in response to the busy indication assertion if the memory comprises the second memory and the busy indication was asserted.

15. The method of claim 14 wherein the memory comprises a static Random Access Memory (RAM) cache and wherein the step of ignoring the busy indication is performed and the steps of directing the processor to retry an access to the cache and the processor retrying its access are not performed.

16. The method of claim 14 wherein the memory comprises a dynamic RAM cache having the busy indication, wherein the memory interface comprises a cache interface, wherein the busy indication is coupled to the cache interface, and wherein the method further comprises the steps of:
   e) asserting the busy indication when there is an access collision between an access generated by the processor and the dynamic RAM cache, the busy indication informing the processor that the processor needs to retry its access.

17. The method of claim 16 wherein the dynamic RAM is coupled to a clock and wherein the method further comprises the step of:
   e) providing a busy timing indication that allows the busy indication to be asserted on a rising edge of the clock or on a falling edge of the clock.

18. The method of claim 16 wherein the dynamic RAM cache is able to be in a plurality of states, and wherein the access collision is caused because the Dynamic RAM cache is in a precharge, initialization, refresh, or standby state.

19. The method of claim 16 wherein the dynamic RAM cache comprises a dynamic RAM cache memory that is divided into a plurality of banks, each bank corresponding to a class and comprising a plurality of cache lines, each cache line and class corresponding to a range of addresses, and wherein the method further comprises the steps of:
   e) the processor outputting a requested class and a requested address to the dynamic RAM cache;
   f) the dynamic RAM cache fetching data from one of the cache lines in each of the banks of the dynamic RAM cache memory in response to the request; and
   g) the dynamic RAM cache outputting the data that corresponds to the requested class and that corresponds to the requested address when the processor next requests the data at the requested address.

20. The method of claim 16 wherein the dynamic RAM cache comprises a dynamic RAM cache memory that comprises a plurality of lines able to contain data, and wherein the method further comprises the steps of:
   e) providing a read buffer in the dynamic RAM cache that comprises a copy of data from the dynamic RAM cache memory;
   f) fetching at least a portion of the copy of data from the read buffer when the processor requests the portion of data from the dynamic RAM cache; and
   g) outputting the portion of the copy of data to the processor.

21. The method of claim 14 wherein the memory comprises a cache having a cache memory that comprises a plurality of cache lines, each cache line corresponding to a range of addresses, wherein the cache further comprises a write buffer that comprises data corresponding to one of the cache lines, and wherein the method further comprises the steps of:
   e) the processor requesting data from a particular address;
   f) outputting at least a portion of the data in the write buffer to the processor if the particular address falls within the range of addresses that corresponds to the data in the write buffer; and
   g) reading a cache line corresponding to the address from the cache memory if the particular address does not fall within the range of addresses that corresponds to the data in the write buffer.

22. The method of claim 14 wherein the memory comprises a cache having a cache memory that comprises a plurality of cache lines, each cache line corresponding to a range of addresses, wherein the cache further comprises a write buffer that comprises data from one cache line and that corresponds to a particular address range, and wherein the method further comprises the steps of:
   e) the processor requesting a write of data to a certain address; and
   f) writing at least a portion of the data in the write buffer to a cache line in the cache memory if the certain address that is not in the particular address range.

23. The method of claim 14 wherein the memory interface comprises a cache interface and the memory comprises a cache, and wherein the method further comprises the steps of:
   e) providing a size of RAM indication;
   f) setting the size of RAM indication to a particular value; and
   g) allowing the cache interface to interface with a cache having a size equivalent to this particular value.

24. The method of claim 14 wherein the memory interface comprises a cache interface, the memory comprises a cache, the first memory is a static RAM cache, the second memory is a dynamic RAM cache, and wherein the method further comprises the step of providing a type of RAM indication that directs the cache interface to perform the step of ignoring the busy indication if the type of RAM indicator indicates that the cache is static RAM and directs the cache interface to perform the step of directing the processor to retry an access to the cache if the cache comprises dynamic RAM and the busy indication is asserted.

25. The method of claim 14 wherein the memory interface comprises a cache interface and the memory comprises a cache, wherein the processor operates at a speed and wherein the method further comprises the steps of:
   e) providing a speed of interface indication and a clock divider;
   f) dividing the speed of the processor; and
   g) creating at least one clock that is coupled to and used by the cache.

26. A computer system comprising:
   at least one processor having at least one processor cache interface portion, each of the at least one processor cache interface portions for providing a cache interface between the processor and a cache, wherein each processor cache interface portion is configured to interface with a cache that comprises static Random Access Memory (RAM) and alternately with a cache that comprises dynamic RAM having a busy indication, and wherein each processor cache interface portion has a receiver for receiving a busy indication; and at least one cache, each of the at least one caches coupled to one processor cache interface portion of one of the at least one processors, wherein any of the at least one caches that comprise dynamic RAM couples its busy indication to the receiver of the processor cache interface portion corresponding to the dynamic RAM cache, and wherein each processor cache interface portion that is coupled to a static RAM cache ignores the busy indication and each processor cache interface portion that is coupled to a dynamic RAM cache directs its respective processor to retry an access if the busy indication is asserted.

* * * * *